United States Patent [19]

Furuya et al.

[11] Patent Number: 5,161,480

[45] Date of Patent: Nov. 10, 1992

[54] INDICATION DISPLAY UNIT FOR A VEHICLE

[75] Inventors: Yoshiyuki Furuya; Kunimutsu Aoki; Tadashi Iino, all of Shizuoka, Japan

[73] Assignee: Yazaki Corporation, Tokyo, Japan

[21] Appl. No.: 748,737

[22] Filed: Aug. 22, 1991

[30] Foreign Application Priority Data

Aug. 24, 1990 [JP] Japan ............... 2-221038

[51] Int. Cl.$^5$ .............. G01P 5/00; G01D 11/28
[52] U.S. Cl. ............... 116/62.1; 116/286; 116/DIG. 39; 116/304; 340/705; 340/461; 353/14; 359/631
[58] Field of Search ............ 116/304, 305, 286, 28 R, 116/62.1, 62.4, DIG. 36, DIG. 39; 353/11, 12, 13, 14, 98, 99, 81; 359/630, 631, 633; 340/705, 461, 462, 980

[56] References Cited

U.S. PATENT DOCUMENTS

| | | | |
|---|---|---|---|
| 1,762,933 | 6/1930 | Mihalyi | 353/98 X |
| 2,686,455 | 8/1954 | Porsche | 353/14 |
| 3,302,515 | 2/1967 | Knus | 353/98 |
| 3,848,974 | 11/1974 | Hosking et al. | 340/705 |
| 3,887,273 | 6/1975 | Griffiths | 353/14 |
| 3,892,474 | 7/1975 | Nilsson | 359/631 X |
| 4,114,997 | 9/1978 | Lunetta | 353/11 |
| 4,611,877 | 9/1986 | Ellis | 359/630 X |
| 4,971,436 | 11/1990 | Aoki et al. | 353/98 X |
| 4,973,942 | 11/1990 | Iino | 340/705 X |
| 4,991,537 | 2/1991 | Muramatsu | 116/286 |

FOREIGN PATENT DOCUMENTS

| | | | |
|---|---|---|---|
| 0859823 | 12/1940 | France | 353/14 |
| 0041545 | 3/1977 | Japan | 116/304 |
| 0057633 | 5/1977 | Japan | 340/705 |
| 0191847 | 9/1985 | Japan | 340/461 |
| 0012450 | 1/1986 | Japan | 340/705 |
| 0193735 | 7/1990 | Japan | 116/28 R |
| 0193736 | 7/1990 | Japan | 116/28 R |
| 0193737 | 7/1990 | Japan | 116/28 R |
| 0216336 | 8/1990 | Japan | 116/28 R |
| 8902611 | 3/1989 | PCT Int'l Appl. | 359/630 |

Primary Examiner—William A. Cuchlinski, Jr.
Assistant Examiner—John L. Beres
Attorney, Agent, or Firm—Nikaido, Marmelstein, Murray & Oram

[57] ABSTRACT

An indication display unit for a vehicle provides a driver with a circular meter indication by an analog meter having a scale disposed along with a circumference and an indication needle disposed inside the circumference, which is made in consideration not only from the function's point of view as is conventionally done, but also from the view point of the decorative design as well so as to produce many user's long-awaited new type of interesting meter indication.

In the indication display unit according to the present invention, since a circular meter indication of an analog meter is optically converted to an oval shape by use of either a positive cylindrical lens, a negative cylindrical lens or a concave reflecting member having a different magnification rate between the longitudinal direction and lateral direction which are respectively disposed facing the indication surface of the analog meter, the indication observed through a prism reflecting member disposed between the above optical materials and the analog meter is such that the indication needle extends or reduces in accordance with the rotated angle thereof making an oval-shaped image of the analog meter, so that quite interesting and tasteful meter indication is thereby offered.

10 Claims, 12 Drawing Sheets

F I G . 7
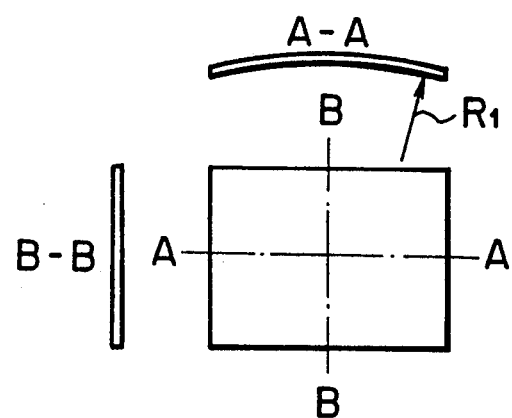

F I G . 8
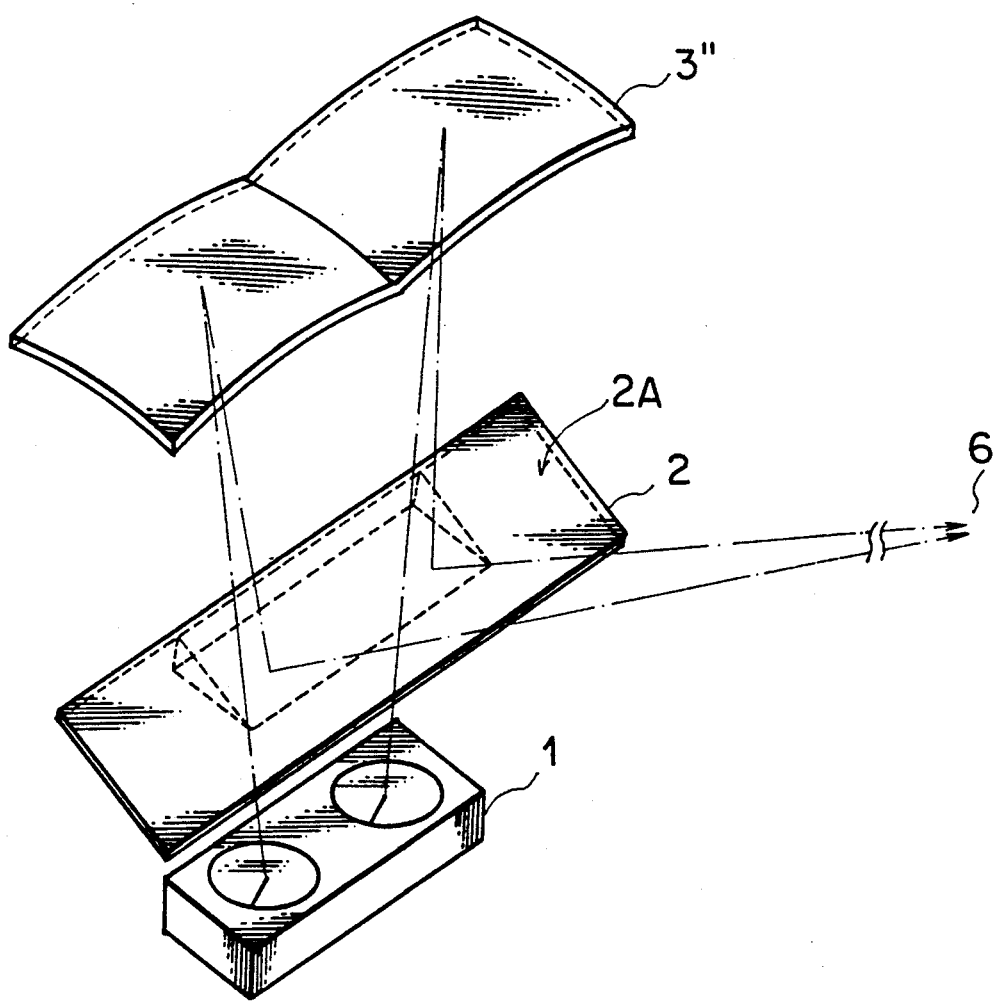

F I G. 11A
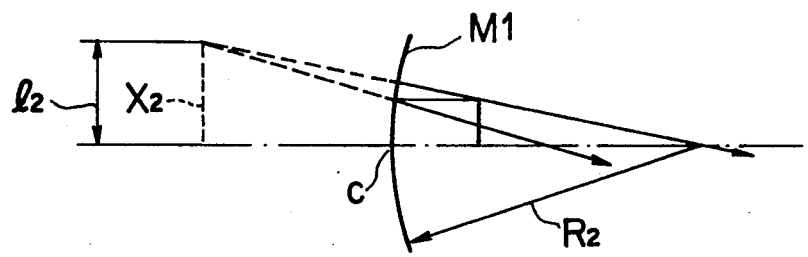
F I G. 11B
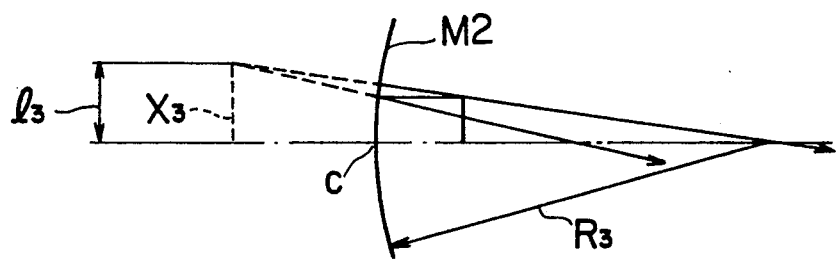
F I G. 12
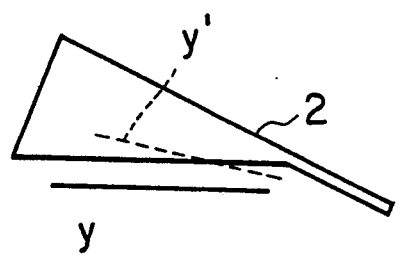

1

INDICATION DISPLAY UNIT FOR A VEHICLE

BACKGROUND OF THE INVENTION

1. Field of the Invention

This invention relates to an indication display unit for a vehicle wherein various information such as a vehicle speed, frequency of engine revolution and so on are indicated by an analog meter indication performed by use of an analog meter.

2. Description of the Prior Art

A device of this type that indicates driving information by a meter is conventionally disclosed, for example, as the vehicle-mounted meter shown in FIG. 17.

In the figure, reference numeral 71 denotes an inner mechanism disposed inside the meter for rotating a needle shaft 71a in accordance with a signal from a vehicle speed sensor or the like, reference numeral 72 denotes an indication needle mounted on the needle shaft 71a, numeral 73 denotes a scale plate whose surface, for example, is formed as shown in FIG. 16. The scale plate shown in the same figure is a speed meter in which a scale 73a is formed in an arcuate shape, and the indication needle 72 is rotated by the inner mechanism 71 so as to indicate various degrees of the scale 73a. This meter is made in consideration for indication during the night time wherein a light conducting plate 74 is disposed between the inner mechanism 71 and the scale plate 73, and the scale 73a is formed in a light transmissible mode, whereby the light emitted from a light source bulb 75 is taken into the light conducting plate 74 through end portions 74a thereof so as to irradiate the light conducting plate 74 at the back surface of the scale plate 73, so that the scale 73a and the indication needle 72 are thereby irradiated.

In an indication display unit for a vehicle of this type, specially the one to be mounted on a sedan type passenger vehicle, not only the indication function thereof but its indicating method from the view point of a decorative design is also considered as a very important factor, a case in point being the one which is lately invented and performs digital indication by use of a fluorescent tube, a liquid crystal display panel and so forth. However, many users still prefer rotative analog indication meters by which indications are performed by a rotative indication needle, so that development of an unconventional new type of analog indication meter is desired nowadays.

SUMMARY OF THE INVENTION

The present invention has been made to eliminate such problems as described above, and it is an object of the present invention to provide an indication display unit for a vehicle which is capable of offering a driver an unconventional new type of unique and tasteful meter indication wherein the indicating style thereof is considered not only from the function's point of view as is conventionally done, but also from the view point of the decorative design as well.

An indication display unit for a vehicle according to the first aspect of the present invention to solve foregoing subject comprises an analog meter having an inner mechanism having a needle shaft extending therefrom. A casing is disposed at the needle shaft side of the inner mechanism. A reflector is stored in the casing and has a cylindrical concave surface thereof directed to the open side of the casing. A discharge lamp is disposed along the focal point of the reflector. The focal point is a straight line. A light dispersing plate is disposed in such a way as to cover the open side of the casing. A scale plate has the scale disposed in front of the light dispersing plate. An indication plate is superposed on the scale plate and has the indication needle thereon. The center portion of the indication plate is firmly fixed at the end of the needle shaft. A cylindrical convex lens is disposed at the indication surface side of the analog meter such that the cylinder axis thereof is directed in the longitudinal direction of the scale. The scale and the indication needle are magnified in the lateral direction thereof by the cylindrical convex lens so as to perform thereby an oval-shaped meter indication.

Further, an indication display unit for a vehicle according to the second aspect of the present invention comprises an analog meter comprising an inner mechanism having a needle shaft extending therefrom. A casing is disposed at the needle shaft side of the inner mechanism. A reflector is stored in the casing and has a cylindrical concave surface thereof directed to the open side of the casing. A discharge lamp disposed along with the focal point of the reflector. The focal point is a straight line. A light dispersing plate is disposed in such a way as to cover the open side of the casing. A scale plate has the scale disposed in front of the light dispersing plate. An indication plate is superposed on the scale plate and has the indication needle thereon. The center portion of the indication plate is firmly fixed at the end of the needle shaft. A cylindrical concave lens is disposed at the indication surface side of the analog meter such that the cylinder axis thereof is directed in the lateral direction of the scale. The scale and the indication needle are reduced in the longitudinal direction thereof by the cylindrical concave lens so as to perform thereby an oval-shaped meter indication.

Still further, an indication display unit for a vehicle according to a further aspect of the present invention comprises an analog meter having an inner mechanism having a needle shaft extending therefrom. A casing is disposed at the needle shaft side of the inner mechanism. A reflector stored in the casing and has a cylindrical concave surface thereof directed to the open side of the casing. A discharge lamp is disposed along the focal point of the reflector. The focal point is a straight line. A light dispersing plate is disposed in such a way as to cover the open side of the casing. A scale plate has the scale disposed in front of the light dispersing plate. An indication plate is superposed on the scale plate and has the indication needle thereon. The center portion of the indication plate being is firmly fixed at the end of the needle shaft. A reflecting device has a concave reflecting surface directed to the indication surface side of the analog meter and is disposed such that the radius of curvature of the concave reflecting surface corresponding to the longitudinal direction of the scale is made longer than the radius of curvature corresponding to the lateral direction thereof. The the indication surface of the analog meter is disposed within the focal point of the reflecting surface of the reflecting device corresponding to the curvature in the lateral direction thereof. The meter indication, in the lateral direction with respect to the scale and the indication needle, is observed relatively larger than that in the longitudinal direction thereof due to the difference of the magnification rate of the reflecting member corresponding respectively to the longitudinal direction and the lateral direction of the scale, thereby performing a meter indication of an oval shape.

In each of the display units according to the present invention, each of the above meters performs circular meter indication by a scale disposed along the circumference thereof and an indication needle disposed within the circumference as is performed by a conventional device, but a cylindrical convex lens, a cylindrical concave lens and a reflecting member respectively make the meter indication relatively larger in the lateral direction than in the longitudinal direction thereof with respect to each of the meter and the indication needle, thereby optically converting it into an oval-shaped meter indication.

BRIEF DESCRIPTION OF THE DRAWINGS

The specific nature of the invention, as well as other objects, usage and advantages thereof will become more apparent from the following description taken in conjunction with the accompanying drawings in which:

FIG. 7 is an illustration showing the construction of the cylindrical concave reflecting surface of a reflecting plate according to the third embodiment of the present invention;

FIG. 8 is an exploded perspective view showing an indication display unit for a vehicle according to a fourth embodiment of the present invention;

FIGS. 11A and 11B are illustrations showing a relationship between the radius of curvature and the magnification rate regarding the spherical mirror related to the fourth embodiment;

FIG. 12 is an illustration showing the function of the prism reflecting member related to the above embodiments;

DETAILED DESCRIPTION OF THE PREFERRED EMBODIMENTS

Figure 1:
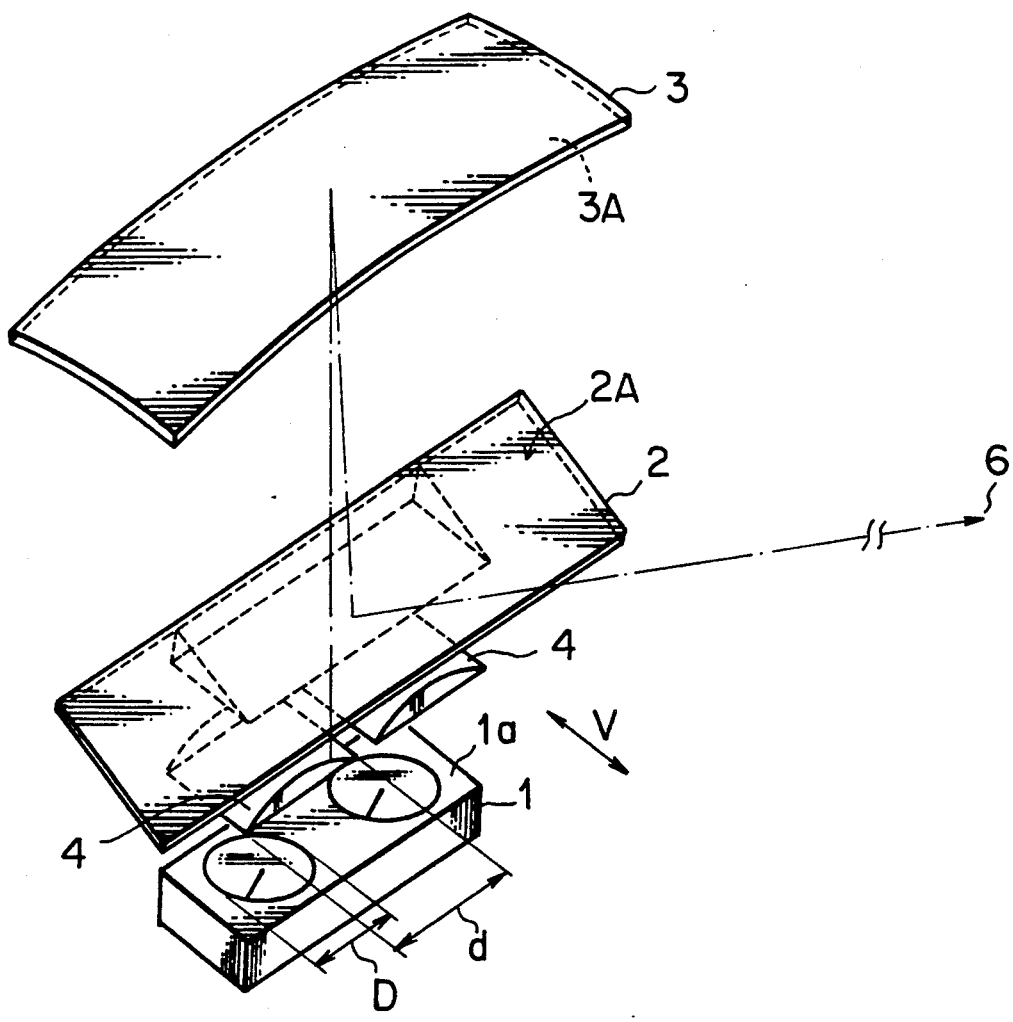
FIG. 1 is an exploded perspective view showing an indication display unit for a vehicle according to a first embodiment of the present invention.

In the following, the embodiments of the present invention are described with reference to the drawings. It is to be noted that like reference characters in each figure denote like or corresponding portions of the conventional embodiments so as to avoid repetition of the explanation.

Figure 2:
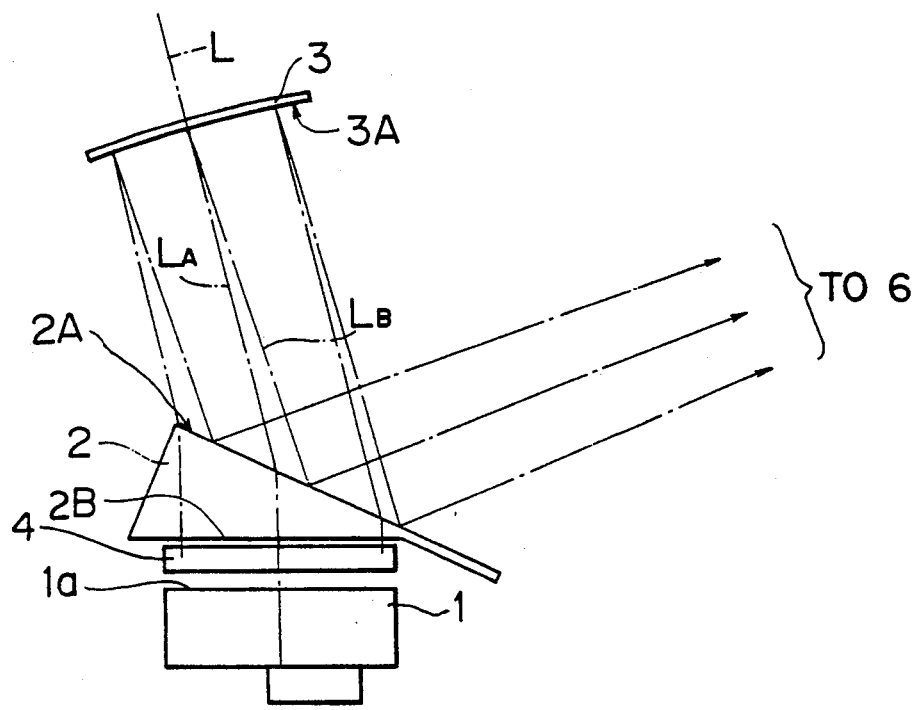
FIG. 2 is a side view showing the construction of the above display unit.
Figure 3:
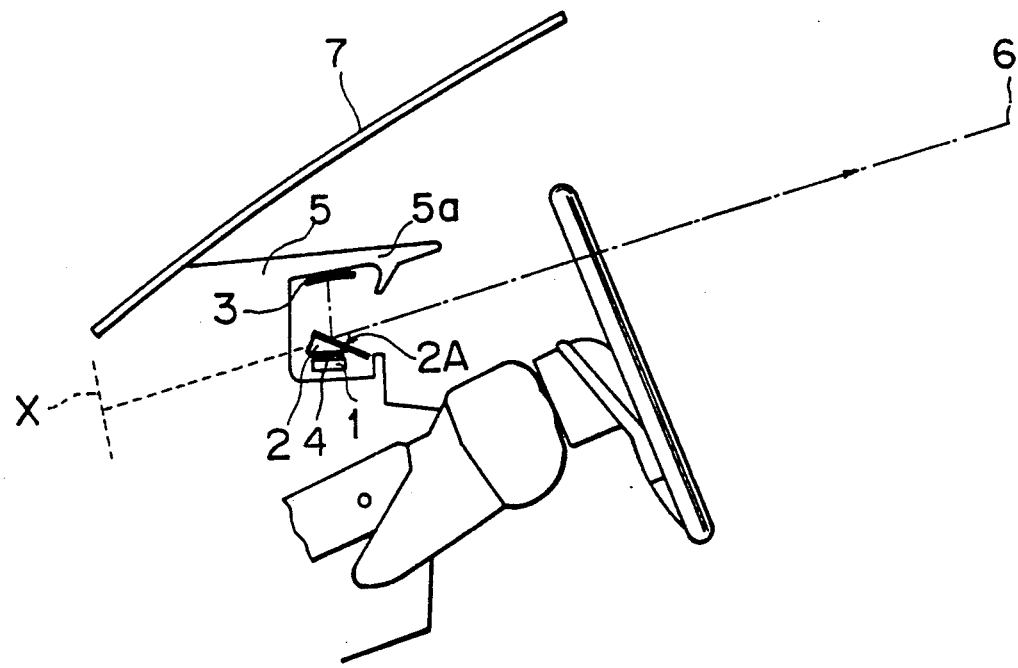
FIG. 3 is an illustration showing the state in which the above display unit is mounted on a vehicle.

FIG. 1 is an exploded perspective view showing an indication display unit for a vehicle according to a first embodiment of the present invention, FIG. 2 is a side view showing its construction and FIG. 3 shows a state in which the display unit is mounted on a car.

In the figures, reference numeral 1 denotes a light emitting type analog meter which indicates vehicle speed or the like by irradiating a circular scale and an indication needle formed in a slit shape as explained later on, reference numeral 2 denotes a prism reflecting member comprising a prism and a flat plate which are integrally formed with each other by molding or adhesion or the like as explained later, reference numeral 3 denotes a reflecting plate whose spherical concave reflecting surface 3A faces the prism reflecting means, and numeral 4 denotes a cylindrical convex lens (cylindrically convexed lens), wherein the analog meter 1, the prism reflecting member 2, the reflecting plate 3 and the cylindrical convex lens 4 construct altogether an indication display unit of the first embodiment, which is stored inside an instrument panel 5.

Reference numeral 6 denotes a visual point of the driver, and numeral 7 denotes a windshield.

The indication display unit according to this embodiment displays an indication in the distance by way of the reflections for enabling the driver to quickly observe it, and also performs a high contrast display with a dark back side view by use of a semi-transparent reflecting surface. For this purpose, a light emitting type analog meter which emits light of high brightness and a prism reflecting member 2 which forms a semi-transparent reflecting surface are adopted in the embodiment, wherein for enhancing the visible range of a virtual image to be observed, the reflecting plate 3 magnifies the virtual image, and the prism reflecting member enhances the reflecting surface by forming a flat plate section integrally with one surface of the prism section of the prism reflecting member 2.

Figure 13:
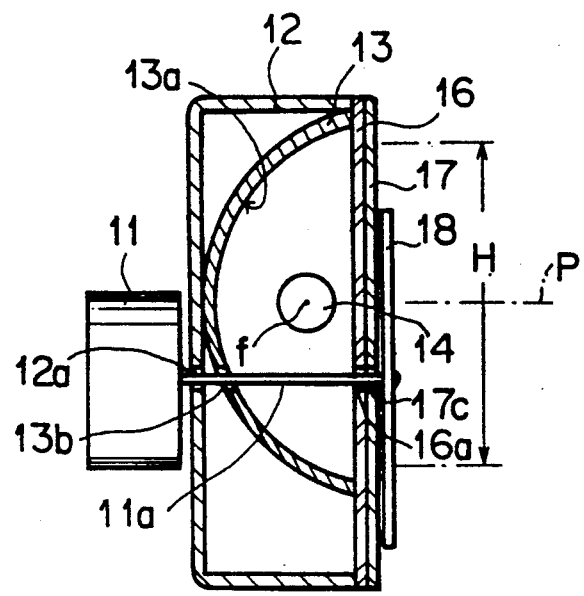
FIG. 13 is a sectional view of the analog meter related to the above embodiments.
Figure 14:
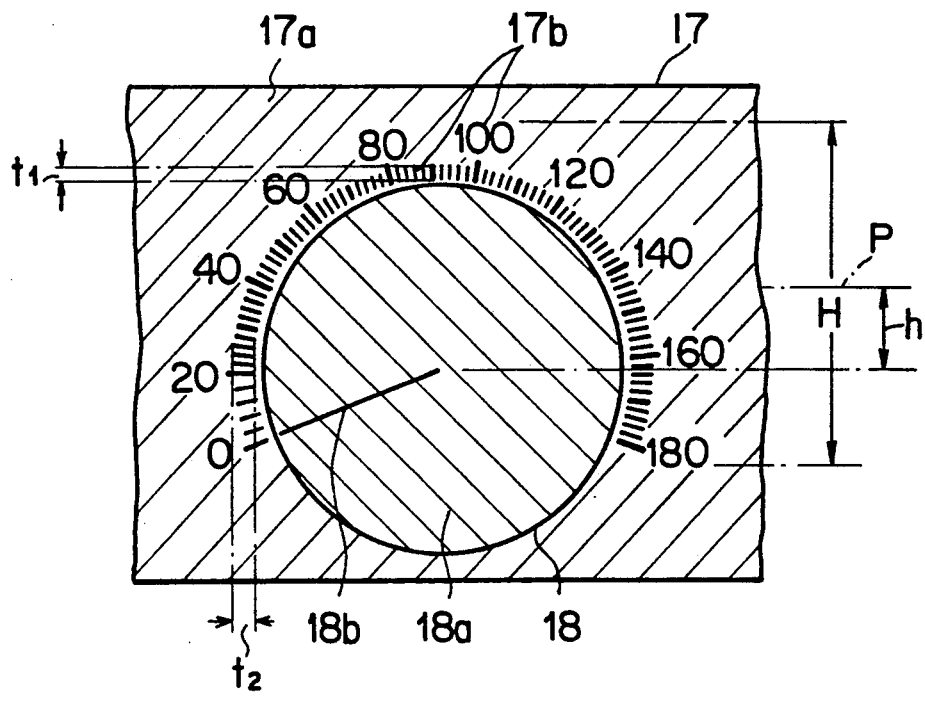
FIG. 14 is a partial front view of the above analog meter.
Figure 14:
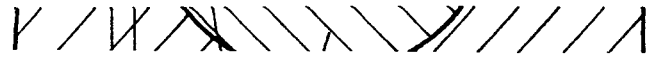
Figure 15:
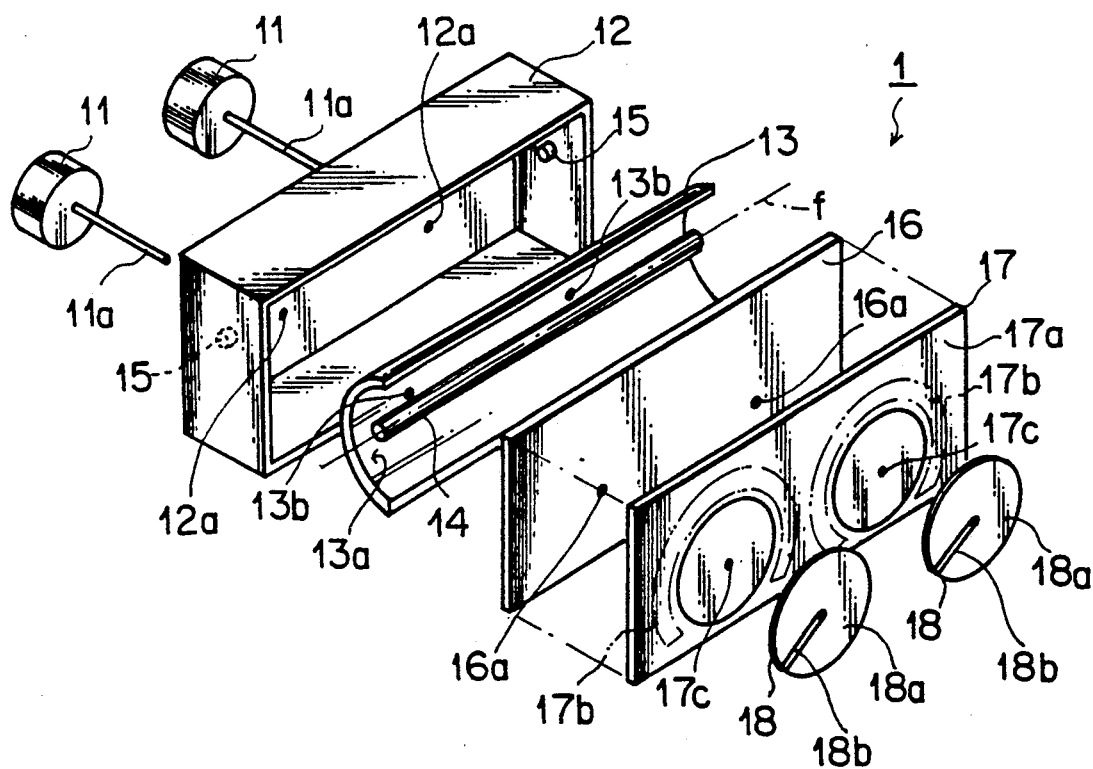
FIG. 15 is an exploded perspective view of the above analog meter.
Figure 16:
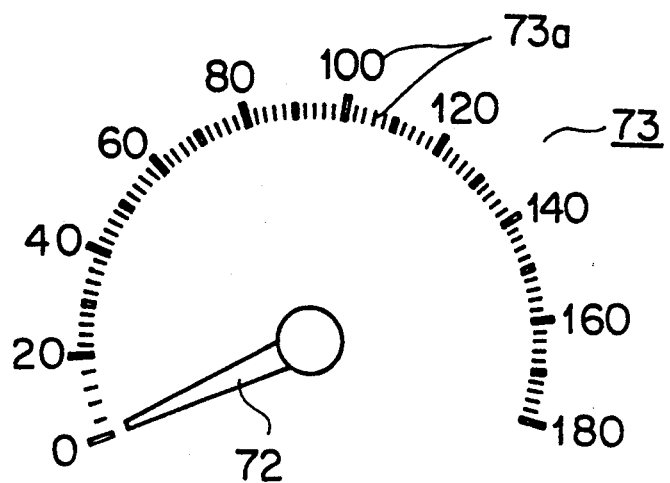
FIG. 16 is an illustration showing the indication surface of a conventional analog meter.
Figure 17:
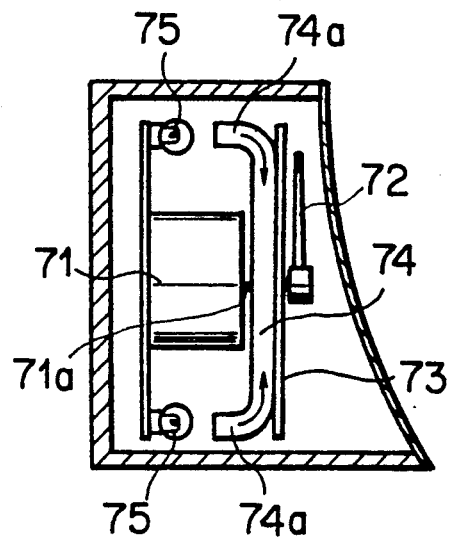
FIG. 17 is an illustration showing one embodiment of the conventional analog meter.

FIG. 13 is a partial sectional view showing an analog meter 1, FIG. 14 is a partial front view thereof and FIG. 15 is an exploded perspective view thereof.

In the figures, reference numeral 11 denotes an inner mechanism disposed inside the meter for rotating a needle shaft 11a in accordance with an electric signal fed from a circuit not shown, the inner structure thereof is, although minimized this time, same as the conventionally known analog meter. Reference numeral 12 denotes a casing disposed at the needle shaft 11a side which means the front surface side of the inner mechanism 11, reference numeral 13 denotes a reflector stored inside the casing 12 with its reflecting surface 13a of the cylindrical concave surface directed to the open side of the casing 12, numeral 14 denotes a cold cathode discharge tube (a discharge lamp) disposed along the focal point f of the reflector 13, wherein the cold cathode discharge tube 14 is connected to the power source by way of a lead drawn out from a socket 15 in the casing 12, thereby constructing a high-power light source. Since the reflector 13 forms a concave mirror by the reflecting surface 13a of the cylindrical concave surface thereof, the focal point f thereof is formed in a straight line as shown in FIG. 15.

Reference numeral 16 denotes a light dispersing plate disposed such that it covers the open side of the casing 12, reference numeral 17 denotes a scale plate disposed in front of the light dispersing plate 16, numeral 18 denotes an indication plate of a circular form disposed in front of the scale plate 17, the center of the indication plate 18 being firmly fixed at the end portion of the needle shaft 11a.

As shown in FIG. 14, the scale plate 17 is formed with a black face 17a (slanted portion) by a printing processing or the like of a black color on a transparent resin plate, the section 17b thereof representing the scale degrees and numbers (scale section) is left unprinted and this scale section 17b and the circular portion on which the indication plate 18 is superposed are constructed in a light transmissible form. As shown in the same figure, length of one scale degree t1 and that of another scale degree t2 are different from each other, and by making the relationship thereof as $t1 < t2$, deforming effect to make the meter indication in an oval shape can be much more enhanced.

Further, the indication plate 18 is formed with a black face 18a (slanted portion) by printing a black color processing on a circular transparent resin plate, a light transmissible slit 18b is formed by printing the whole indication plate from the external circumference towards the center portion thereof but leaving one part thereof unprinted, and the thus formed slit pays a role as an indication needle. Here, the above described scale section 17b and the slit 18b can be formed also as grooves in case the respective black faces 17a and 18a are formed with a light intransmissive stuff.

Generally in most analog meters to be mounted on a vehicle, the scale is formed only in some range of the circumference thereof, just like in the range from eight to four o'clock in the case of a clock plate.

The scale plate 17 of this embodiment is not formed in the whole range of the circumference thereof either as is shown in FIG. 14, but is constructed such that the center point of the indication plate 18 is settled lower than the center point P of the height H of the scale section for a predetermined distance h. Further, as shown in FIG. 13, the height of the reflecting surface 13a of the reflector 13 is constructed such that it includes the height H of the scale section 17b, and still further, the center point of the reflector and the location of the cold cathode discharge tube 14 are formed in such a manner that they coincide with an approximate center point P of the height H of the scale section 17b. Corresponding to the center point of the indication plate 18, axial holes with small diameter 17c, 16a, 13b and 12a are formed respectively in the scale plate 17, light dispersing plate 16, reflector 13 and in the casing 12, wherein the needle shaft 11a penetrates through each of the axial holes 12a, 13b, 16a and 17c, and also passes under the cold cathode discharge tube 14 towards the center point of the indication plate 18.

By this construction above, the light emitted from the cold cathode discharge tube 14 is dispersed by the light dispersing plate 16, and also the light directed to the reflector 13 is reflected substantially in parallel and then dispersed by the light dispersing plate 16. Whereafter, uniform and bright light is irradiated to the back side of the scale plate 17 and the indication plate 18 by way of the light dispersing plate 16, whereby the scale degrees, numbers and the slit 18b only are brightly observed, and when the indication plate 18 is rotated by the inner mechanism 11, the irradiated indication needle (the slit 18b) is rotated to point the irradiated scale degree, thereby performing the circular meter indication.

As shown in FIG. 2, the analog meter 1 is disposed in such a way that the indication surface 1a thereof is directed to a second surface 2B of the prism reflecting member 2, and a cylindrical convex lens 4 is disposed between the second surface 2B of the prism reflecting member 2 and the indication surface 1a. Further, the reflecting plate 3 is disposed such that the light axis L of the reflecting surface 3A of the speherical surfacc thereof is inclined with respect to the reflecting surface 2A of the prism reflecting member 2, and at the same time a virtual image on the indication surface 1a indicated by way of the cylindrical convex lens 4 is disposed within the focal point of the reflecting surface 3A thereof.

The analog meter 1 is disposed such that the driver's visual point 6 side of the indication surface 1a thereof coincides with the lower part of the above described scale section 17b, that is, the upward and downward direction of the indication surface 1a respectively coincide with forward and rearward direction of the vehicle.

Further as shown in FIG. 1, the cylindrical convex lens is disposed in such a manner that the axis of the cylindrical body including the arcuate surface thereof coincides with the longitudinal direction (an arrow V in the figure) of the indication surface 1a of the analog meter 1, and still further, the lateral width d of the cylindrical convex lens 4 is constructed longer than the diameter D of the scale section 17b of the analog meter 1.

The chain lines shown in FIG. 2 represent the rays of light which are emitted from the analog meter 1 and pass the center line of the cylindrical convex lens 4 including the axis thereof, and then finally directed to the driver's visual point 6, and if the explanation is required based on the tracks of these respective rays of light, it will be such that the indication light projected from the analog meter 1 enters the prism reflecting member 2 at an right angle with respect to the second surface thereof by way of the cylindrical convex lens 4, but on transmitting through the reflecting surface 2A of the prism reflecting member 2, the indication light is refracted as shown by the light axis LA, and enters substantially at an right angle with respect to the reflecting plate 3.

At the reflecting plate 3, the indication light is reflected as the line LB which is shifted from the line LA after satisfying the normal reflecting condition, and then again reflected on the reflecting surface 2A and thereafter further directed to the driver's visual point 6. Accordingly, when the driver observes the reflecting surface 2A from the visual point 6 or the nearby area, the virtual image X indicated by the analog meter 1 is observed at the location behind the prism reflecting member 2 (forwardly side of the vehicle). The thus observed virtual image is located within the angle range including the reflecting surface 2A, and is observed magnified in the distance by the repetition of the reflection and the magnification performed by the reflecting plate 3 as described above.

Figure 4:
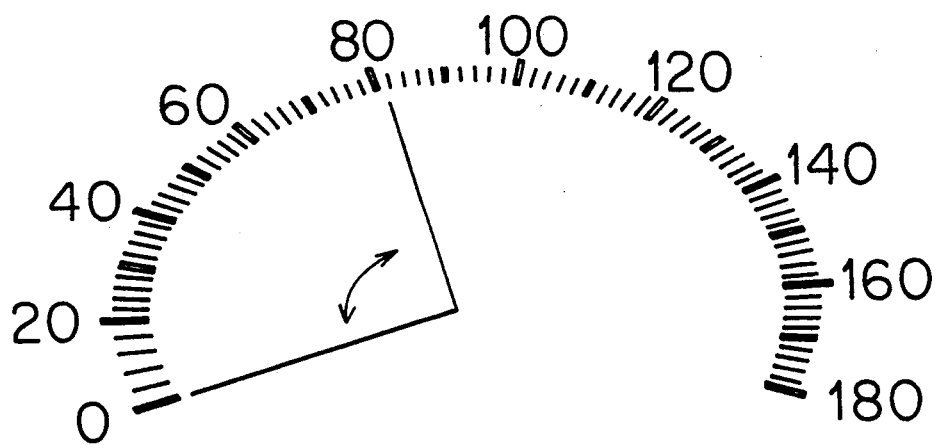
FIG. 4 is an illustration showing an example of the indication made by this embodiment.

Since the cylindrical axis of the cylindrical convex lens 4 is directed in the longitudinal direction of the indication surface 1a, the indication pattern on the indication surface 1a is magnified in the lateral direction by this cylindrical convex lens 4, so that the thus magnified virtual image is observed by way of the reflections conducted on the reflecting plate 3 and the reflecting surface 2A. Accordingly, the indicated image observed from the driver's seat will be as shown in FIG. 4 wherein the pattern of the scale section 17b is an oval shape, and further, length of the indication needle (slit) varies depending on the rotated location (indicated scale degree) thereof.

Figure 5:
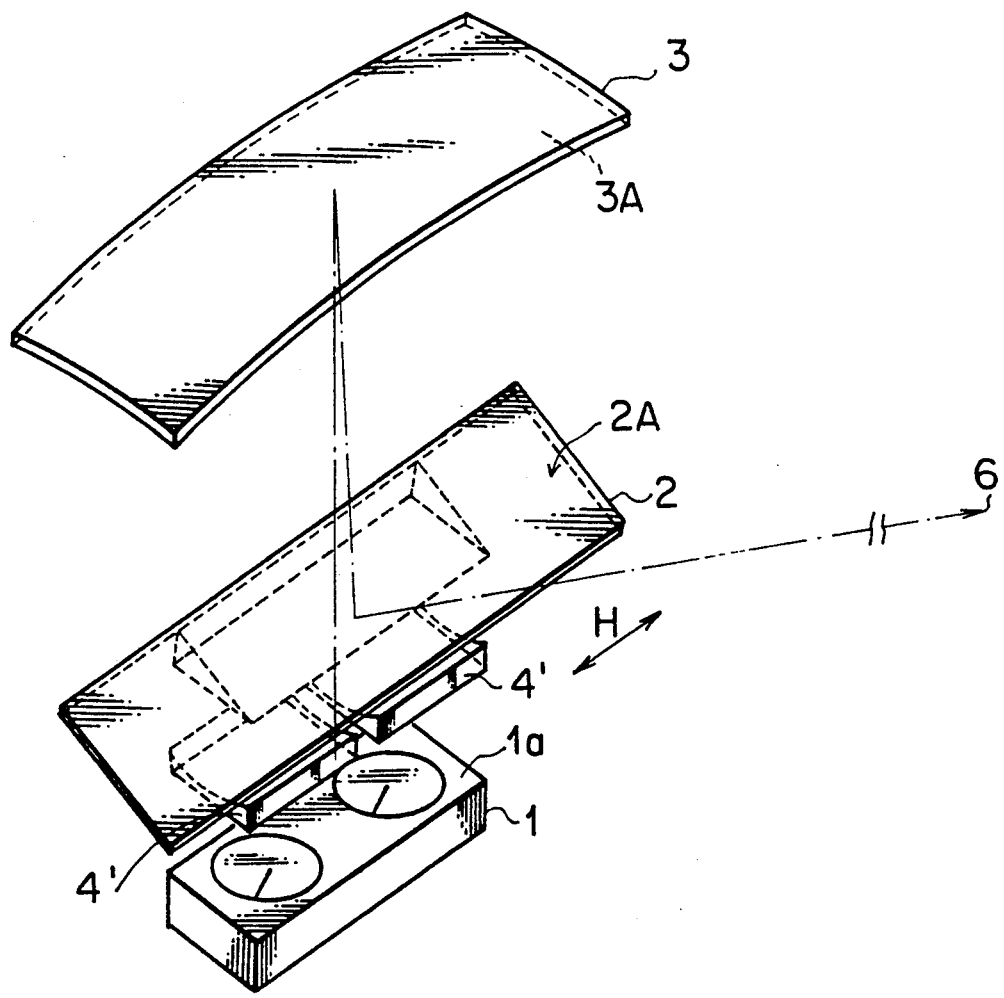
FIG. 5 is an exploded perspective view showing an indication display unit for a vehicle according to a second embodiment of the present invention.

FIG. 5 is an exploded perspective view showing an indication display unit for a vehicle according to the second embodiment of the present invention, and the portions corresponding to those in the first embodiment have the same reference numbers.

In the figure, reference numeral 4' denotes a cylindrical concave lens (cylindrical concave lens) wherein the axis the cylindrical body including the arcuate surface of this cylindrical concave lens 4' is disposed in the lateral direction of the indication surface 1a (an arrow H in the figure) with respect to the analog meter 1. Therefore, the meter indication on the indication surface 1a becomes a virtual image reduced in the longitudinal direction, whereby the indicated image observed from the driver's seat will be as shown in FIG. 4 wherein the pattern of the scale section 17b is observed in an oval shape, and further, length of the indication needle (slit) varies depending on the rotated location (indicated scale degree) thereof.

In the above first and second embodiments, although a magnified image is displayed in the distance by the prism reflecting member 2 and the reflecting plate 3, the same oval shape indication can be obtained by directly observing it through the cylindrical convex lens or the cylindrical concave lens disposed in front of the analog meter.

Figure 6:
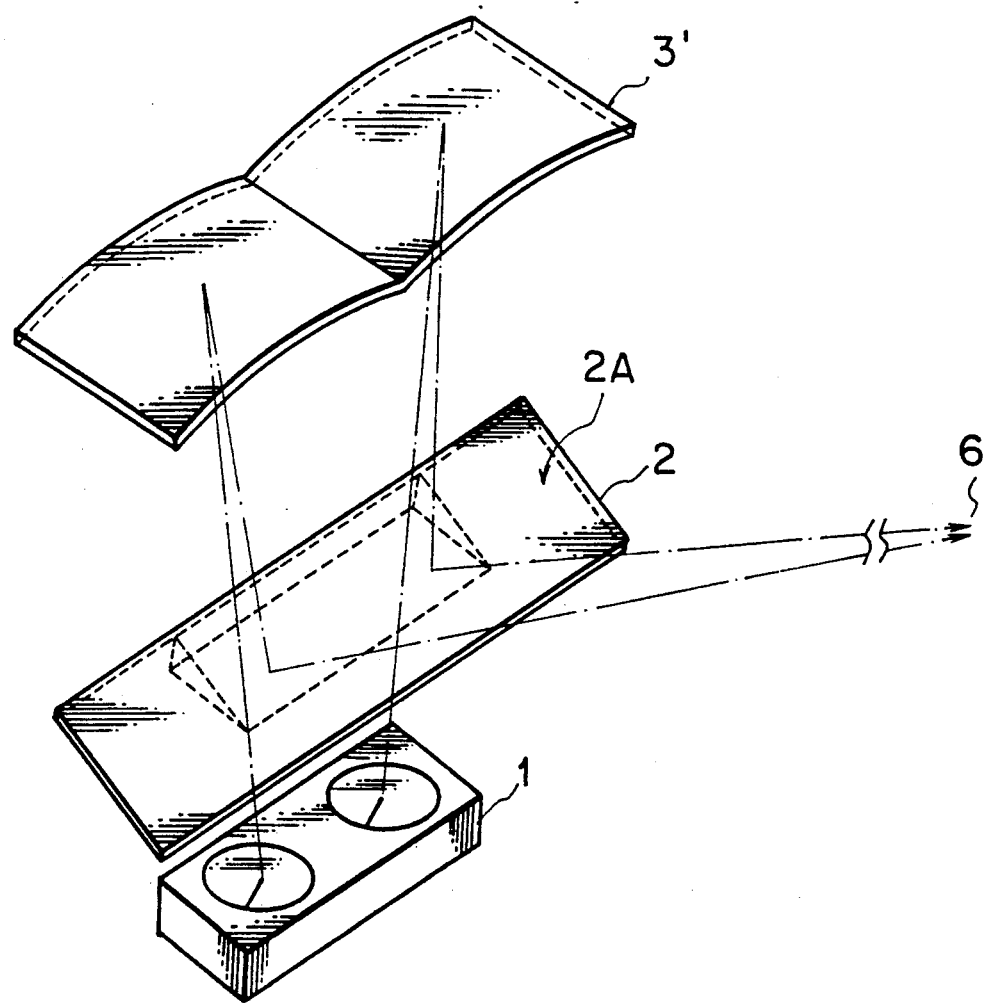
FIG. 6 is an exploded perspective view showing an indication display unit for a vehicle according to a third embodiment of the present invention.

FIG. 6 is an exploded perspective view showing an indication display unit for a vehicle according to the third embodiment of the present invention, and the portions corresponding to those in FIG. 1 have the same reference numbers. The indication display unit of this third embodiment does not adopt the cylindrical convex lens 4 shown in FIG. 1, but instead of the reflecting plate 3 adopts a reflecting plate 3' which comprises two cylindrical concave reflecting surfaces respectively corresponding to a speed meter and a tachometer of the analog meter 1. Further, as shown by the chain lines in FIG. 6, the meter indications of the respective speed meter and the tachometer of the analog meter 1 are reflected on the respective cylindrical concave reflecting surfaces and directed to the driver's visual point 6.

FIG. 7 is an explanatory view showing a shape of the cylindrical concave reflecting surface of the reflecting plate 3', wherein sectional surface A—A of each of the cylindrical concave reflecting surfaces corresponding to the lateral direction of the indication surface 1a of the analog meter 1 is shown by a curve line having a radius of curvature R1, and sectional surface B—B thereof corresponding to the longitudinal direction of the indication surface 1a of the analog meter 1 is shown by a straight line. That is, the reflecting plate 3' does not have an indication magnifying function in the longitudinal direction of the indication surface 1a corresponding to the sectional surface B—B thereof, but does have it in the lateral direction of the indication surface 1a corresponding to the sectional surface A—A.

Accordingly, when each of the indications of the speed meter and the tachometer on the analog indication meter 1 is projected to the reflecting plate 3' by way of the prism reflecting member 2 and reflected thereon, the same oval-shaped meter indication as that shown in FIG. 4 is thereby observed.

FIG. 8 is an exploded perspective view showing an indication display unit for a vehicle according to the fourth embodiment of the present invention, and the portions corresponding to those in FIG. 6 have the same reference numbers. In the indication display unit of this fourth embodiment, a reflecting plate 3" having two non-spherical concave reflecting surfaces respectively corresponding to the speed meter and the tachometer of the analog meter 1 is adopted instead of the reflecting plate 3' which is adopted in the third embodiment of the present invention, and as shown by the chain lines in FIG. 8, the meter indications of the respective speed meter and the tachometer of the analog meter 1 are reflected on the respective non-spherical concave reflecting surfaces and directed to the driver's visual point 6.

Figure 9:
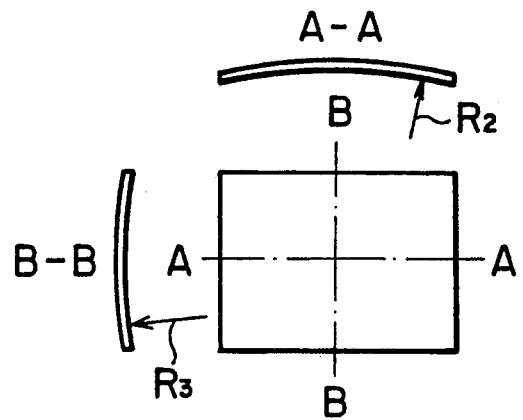
FIG. 9 is an illustration showing the construction of the non-spherical concave reflecting surface of a reflecting plate according to the fourth embodiment of the present invention.
Figure 10:
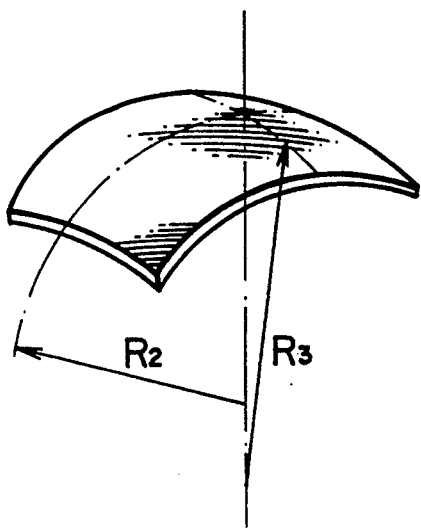
FIG. 10 is a perspective view showing the variation of the radii of curvature of the reflecting plate according to the fourth embodiment of the present invention.

FIG. 9 is an explanatory view showing a shape of the non-spherical concave reflecting surface of the reflecting plate 3", wherein sectional surface A'—A' of each of the non-spherical concave reflecting surfaces corresponding to the lateral direction of the indication surface 1a of the analog meter 1 is shown by a curve line having a radius of curvature R2, and sectional surfaces B'—B' thereof corresponding to the longitudinal direction of the indication surface 1a of the analog meter 1 is shown by a curve line with a radius of curvature R3, wherein as shown in a perspective view in FIG. 10, the radii of curvature shifting on the light axis L serially vary between the range R2 and R3, and the relationship therebetween is R2<R3.

FIGS. 11A and 11B are explanatory views respectively showing the relationship between the radius of curvature and magnification rate in a spherical mirror, wherein the radius of curvature R2 of the spherical mirror M1 in FIG. 11A is smaller than the radius of curvature R3 of the spherical mirror M2 in FIG. 11B, and these spherical mirrors M1 and M2 respectively form virtual image X2 and X3 of an object of the same size from respective center points C thereof, but the length l2 of the virtual image X2 made by the spherical mirror M1 having the smaller radius of curvature is longer than the length l3 of the virtual image X3 made by the spherical mirror M2 having the larger radius of curvature. In short, in the reflecting plate 3", the magnification rate with respect to the indication surface 1a of the analog meter 1 is higher in the lateral direction thereof than in the longitudinal direction, wherein the magnification rate varies serially in the middle portion thereof.

Accordingly, when each of the indications of the speed meter and the tachometer of the analog meter 1 is projected to the reflecting plate 3" by way of the prism reflecting member 2 and reflected thereon, the same oval-shaped meter indication as that shown in FIG. 4 is thereby observed.

In the above third and fourth embodiments, although an image reflected on the prism reflecting member 2 is observed, the same oval-shaped meter indication can also be observed by directly observing the respective reflecting plate 3' and 3" of the respective embodiments.

Further, in each of the first to fourth embodiments, although the prism reflecting member 2 is adopted, a virtual image, which is different in location and size from an image y, is formed by function of the refracting character of the prism reflecting member 2 itself, so that the location of this virtual image y' is observed closer to the prism reflecting member 2 than the image y, and its size is made smaller than the image y in the direction in which the depth of the prism reflecting member 2 reduces. Here, the above image y corresponds respectively to the image magnified by the cylindrical convex lens 4, the image reduced by the cylindrical concave lens 4', and to the indication surface 1a of the analog meter 1 of the respective embodiments.

For this reason, the prism reflecting member 2 itself contains a function to modify the indication slightly to an oval shape apart from the function contained in the cylindrical convex lens 4, cylindrical concave lens 4' and reflecting plates 3', 3" of the respective embodiments. In other words, in the first to fourth embodiments, the indication is further magnified by the prism reflecting member 2.

By use of the present invention, an oval-shaped meter indication can be obtained even without using a prism such as the prism reflecting member 2 disclosed in each embodiment, and in case of the direct observation, a conventional analog meter can also be adopted.

[Effect of the Invention]

As described heretofore, according to the present invention, since a circular meter indication of an analog meter is optically converted to an oval shape by use of either a cylindrical convex lens or cylindrical concave lens or a concave reflecting member having a different magnification rate between the longitudinal direction and lateral direction, the indicating method in which the indication needle extends or reduces in accordance with the rotation thereof is rather tasteful and interesting, so that an indication display unit for a vehicle offering an unconventional new type of meter indication can be thereby obtained.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An indication display unit for a vehicle for providing a driver with a circular meter indication by use of a scale disposed along with a circumference and an indication needle disposed inside said circumference, said indication display unit comprising:

an analog meter including an inner mechanism having a needle shaft extending therefrom, a casing disposed at a needle shaft side of said inner mechanism, a reflector stored in said casing and having a cylindrical concave surface thereof directed to an open side of said casing, a discharge lamp disposed along a focal point of said reflector, said focal point formed as a straight line, a light dispersing plate disposed to cover the open side of said casing, a scale plate having said scale disposed in front of said light dispersing plate, said scale having a longitudinal direction extending from a front to a rear direction of travel of said vehicle, and an indication plate superposed on said scale plate and having said indication needle thereon, a center portion of said indication plate firmly fixed to an end of said needle shaft, said scale plate and indication plate forming an indication surface; and a positive cylindrical lens disposed opposed to said indication surface of said analog meter wherein light from said discharge lamp, after passing through said positive cylinder lens, is observed by said driver, a cylindrical axis of said positive cylindrical lens is directed in said longitudinal direction of said scale, wherein said scale and said indication needle are magnified in a lateral direction thereof by said positive cylindrical lens to form an oval-shaped meter indication.

2. An indication display unit for a vehicle as defined in claim 1 further comprising a reflecting means having a spherical concave reflecting surface, and a prism reflecting member composed of a prism section and a flat plate section integrally formed with one surface of said prism section, said prism reflecting member being disposed between said reflecting means and said positive cylindrical lens.

3. An indication display unit for a vehicle for providing a driver with a circular meter indication by use of a scale disposed along with a circumference and an indication needle disposed inside said circumference, said indication display unit comprising:

an analog meter including an inner mechanism having a needle shaft extending therefrom, a casing disposed at a needle shaft side of said inner mechanism, a reflector stored in said casing and having a cylindrical concave surface thereof directed to the open side of said casing, a discharge lamp disposed along a focal point of said reflector, said focal point formed as a straight line, a light dispersing plate disposed to cover the open side of said casing, a scale plate having said scale disposed in front of said light dispersing plate, said scale having a longitudinal direction extending from a front to a rear side of a direction of travel of said vehicle, and an indication plate superposed on said scale plate and having said indication needle thereon, a center portion of said indication plate firmly fixed to an end of said needle shaft, said scale plate and said indication plate forming an indication surface; and a negative cylindrical lens disposed opposed to said indication surface of said analog meter wherein light from said discharge lamp, after passing through said negative cylindrical lens, is observed by said driver, a cylinder axis of said negative cylindrical lens is directed in a lateral direction of said scale, wherein said scale and said indication needle are reduced in said longitudinal direction thereof by said negative cylindrical lens to form an oval-shaped meter indication.

4. An indication display unit for a vehicle as defined in claim 2 further comprising a reflecting means having a spherical concave reflecting surface, and a prism reflecting member composed of a prism section and a flat plate section integrally formed with one surface of said prism section, said prism reflecting member being disposed between said reflecting means and said negative cylindrical lens.

5. An indication display unit for a vehicle for providing a driver with a circular meter indication by use of a scale disposed along with a circumference and an indication needle disposed inside said circumference, said indication display unit comprising:

an analog meter including an inner mechanism having a needle shaft extending therefrom, a casing disposed at a needle shaft side of said inner mechanism, a reflector stored in said casing and having a cylindrical concave surface thereof directed to an open side of said casing, a discharge lamp disposed along a focal point of said reflector, said focal point formed as a straight line, a light dispersing plate disposed to cover the open side of said casing, a scale plate having said scale disposed in front of said light dispersing plate, said scale having a longitudinal direction extending from a front to a rear direction of travel of said vehicle, and an indication plate superposed on said scale plate and having said indication needle thereon, a center portion of said indication plate firmly fixed to an end of said needle shaft, said scale plate and said indication plate forming an indication surface; and a reflecting means disposed opposed to said indication surface wherein light from said discharge lamp, after reflection from said reflecting means, is observed by said driver, said reflecting means having a concave reflecting surface directed to said indication surface of said analog meter and said reflecting means disposed such that a radius of curvature of said concave reflecting surface, corresponding to said longitudinal direction of said scale, is made longer than a radius of curvatures of said concave reflecting surface corresponding to a lateral direction of said scale, wherein said indication surface of said analog meter is disposed within said focal point of said concave reflecting surface of said reflecting means corresponding to said radius of curvature in said lateral direction thereof, wherein an analog meter indication in said lateral direction with respect to said scale and said indication needle is observed relatively larger than that in the longitudinal direction thereof due to a difference of magnification rate of said reflecting means corresponding respectively to the longitudinal direction and the lateral direction of said scale, therein forming a meter indication of an oval shape.

6. An indication display unit for a vehicle as defined in claim 5, wherein the concave reflecting surface of said reflecting means is of a cylindrical shape.

7. An indication display unit for a vehicle as defined in claim 5, wherein the concave reflecting surface of said reflecting means is of a non-spherical shape.

8. An indication display unit for a vehicle as defined in any one of the claims 1, 3 or 5, wherein said analog meter is constructed such that said scale plate and said indication plate are formed with a black face by a printing processing of a black color on a transparent resin plate, but leaving said scale section and said indication needle unprinted so as to be transmissible.

9. An indication display unit for a vehicle as defined in any one of the claims 1, 3 or 5, wherein said analog meter is constructed such that said scale plate and said indication plate are formed by an intransmissive material wherein said indication needle and said scale portion are formed by cutting out respectively from said scale plate and said indication plate.

10. An indication display unit for a vehicle as claimed in any one of claims 1, 3 or 5, wherein said analog meter is constructed such that a center point of said indication plate is set lower than a center point of a height of said scale section for a predetermined distance, and a height of said reflecting surface of said reflector is formed as to include that of said scale section, and a center point of said reflector and a location of said discharge lamp are formed to coincide with an approximate center point of the height of said scale section.

* * * * *

UNITED STATES PATENT AND TRADEMARK OFFICE
CERTIFICATE OF CORRECTION

PATENT NO. : 5,161,480
DATED : November 10, 1992
INVENTOR(S) : FURUYA et al

It is certified that error appears in the above-identified patent and that said Letters Patent is hereby corrected as shown below:

On the Title page, item [75]
Please change the spelling of the inventor's name from "KUNIMUTSU" to --KUNIMITSU--.

Signed and Sealed this

Nineteenth Day of October, 1993

Attest:

BRUCE LEHMAN

Attesting Officer

Commissioner of Patents and Trademarks